United States Patent [19]

Petrie et al.

[11] Patent Number: 5,098,788

[45] Date of Patent: Mar. 24, 1992

[54] ISOCYANATE FUNCTIONAL POLYMERS

[75] Inventors: Brian C. Petrie, Berkeley, Calif.; Thomas W. Druetzler, Lynwood; Rodney M. Harris, Chicago, both of Ill.

[73] Assignee: The Sherwin-Williams Company, Cleveland, Ohio

[21] Appl. No.: 635,895

[22] Filed: Dec. 26, 1990

Related U.S. Application Data

[60] Division of Ser. No. 292,614, Dec. 30, 1988, Pat. No. 4,983,676, which is a division of Ser. No. 814,336, Dec. 27, 1985, Pat. No. 4,861,853, which is a continuation-in-part of Ser. No. 609,943, May 14, 1984, abandoned.

[51] Int. Cl.⁵ .................. B32B 33/00; B32B 27/08; B32B 27/40
[52] U.S. Cl. .................. 428/394; 428/204; 428/423.3; 428/423.3; 428/423.7; 428/424.2; 428/424.4; 428/425.8; 428/425.9
[58] Field of Search .............. 428/204, 394, 423.3, 428/423.7, 424.2, 424.4, 425.8, 425.9

[56] References Cited

U.S. PATENT DOCUMENTS

| | | | |
|---|---|---|---|
| 2,459,439 | 1/1949 | Lichty et al. | 260/79 |
| 2,606,892 | 8/1952 | Kreps et al. | 260/80.3 |
| 2,718,516 | 9/1955 | Burtnick | 260/86.1 |
| 2,824,858 | 2/1958 | Melamed | 260/77.5 |
| 2,882,260 | 4/1959 | Barti et al. | 260/77.5 |
| 3,914,335 | 10/1975 | Tugukuni et al. | 260/859 |
| 4,008,247 | 2/1977 | Tucker | 260/306 |
| 4,043,982 | 8/1977 | O'Sullivan et al. | 260/47 |
| 4,069,211 | 1/1978 | Nishita et al. | 260/77.5 |
| 4,220,679 | 9/1980 | Backhouse | 427/401 |
| 4,226,901 | 10/1980 | Sugiura et al. | 427/385.5 |
| 4,246,379 | 1/1981 | Howard | 525/440 |
| 4,259,231 | 3/1981 | Tomomoto et al. | 260/42.52 |
| 4,320,220 | 3/1982 | Pampouchidis | 524/591 |
| 4,351,755 | 9/1982 | Brixius et al. | 524/555 |
| 4,367,302 | 1/1983 | LeRoy et al. | 524/104 |
| 4,369,300 | 1/1983 | Carter et al. | 528/28 |
| 4,374,238 | 2/1983 | Shanoski | 528/50 |
| 4,403,003 | 9/1983 | Backhouse | 427/407.1 |
| 4,861,853 | 8/1989 | Petrie et al. | 526/302 |
| 4,983,676 | 1/1991 | Petrie et al. | 525/107 |

FOREIGN PATENT DOCUMENTS 2618980 5/1982 Fed. Rep. of Germany.

OTHER PUBLICATIONS

Chem Abstracts 86:108158x.
Chem Abstracts 90:205138f.
Frank N. Jones, S. Peter Pappas, Hiro-Kuni Ono, Eric H. Urruti, and I-Chyang Lin; *Recent Developments in Crosslinking Chemistry*; Feb. 13-15, 1985, pp. 8-24.

*Primary Examiner*—James C. Cannon
*Attorney, Agent, or Firm*—Robert E. McDonald; Steven W. Tan

[57] ABSTRACT

Isocyanate functional polymers useful as crosslinking agents or as moisture curing polymers, which comprise the addition polymerization reaction product of:

(a) 1 to 100% by weight of at least one isocyanate functional ethylenically unsaturated monomer which comprises the reaction product obtained by the gradual addition of an ethylenically unsaturated monomer having a single active hydrogen to a diisocyanate selected from the group consisting of isophorone diisocyanate and 2,4 toluene diisocyanate wherein the final molar ratio of active hydrogen containing monomer to diisocyanate is essentially 1 to 1; and (b) 0 to 99% by weight of at least one ethylenically unsaturated monomer which is free of active hydrogen functionality and which is copolymerizable with the ethylenically unsaturated isocyanate functional monomer.

8 Claims, No Drawings

ISOCYANATE FUNCTIONAL POLYMERS

CROSS-REFERENCE TO RELATED APPLICATIONS

This application is a divisional application of prior U.S. application Ser. No. 292,614 filed Dec. 30, 1988 (now U.S. Pat. No. 4,983,676). Application Ser. No. 292,614 was a divisional application of prior U.S. application Ser. No. 814,336 filed Dec. 27, 1985 (now U.S. Pat. No. 4,861,853). Application Ser. No. 814,336 was a continuation-in-part of prior U.S. application Ser. No. 609,943 filed May 14, 1984, now abandoned.

BACKGROUND OF THE INVENTION

1. Field of the Invention

This invention relates to novel isocyanate functional polymers which are useful as crosslinking agents for polymers containing active hydrogen functionality, and are also useful as moisture curing polymers.

2. Description of the Prior Art

Isocyanate functional polymers are known in the prior art to be useful as crosslinking agents in combination with active hydrogen containing materials, or by themselves as moisture curing polymers. The commercially available isocyanate crosslinkers, however, frequently contain free monomeric isocyanate molecules which can cause handling problems due to their volatility. This is especially true for polyisocyanates which are prepared as the biuret of monomeric diisocyanates since that reaction often does not proceed to 100% completion and the reaction may be reversible even under routine conditions of storage and handling.

Other prior art methods of preparing isocyanate functional polymers have included the polymerization of blocked isocyanate containing unsaturated monomers such as taught in U.S. Pat. Nos. 3,914,335 and 4,008,247, however, these polymers do not involve free isocyanate.

Although some prior art references, such as West German Patent DE26 18 980 C3, teach the preparation of an isocyanate functional unsaturated monomer by reacting a diisocyanate and an unsaturated monomer having an active hydrogen atom, this prior art fails to teach the polymerization of such monomers to produce isocyanate functional polymers.

SUMMARY OF THE INVENTION

This invention relates to isocyanate functional polymers useful as crosslinking agents, or as moisture curing polymers wherein the polymer comprises the free radical addition polymerization reaction product of a selected isocyanate functional ethylenically unsaturated monomer and optionally at least one other ethylenically unsaturated monomer which is substantially free of active hydrogen functionality. These polymers have special utility as moisture curing polymers, crosslinkers for active hydrogen containing polymers and as clear coatings in clearcoat/basecoat multi-layered coatings.

It is therefore an object of this invention to provide improved moisture curing polymers. It is another object of this invention to provide ungelled polymers having free isocyanate functionality which can be utilized as crosslinking agents for materials containing active hydrogen functionality. Another object of this invention is to provide isocyanate functional polymers which can be utilized as crosslinkers and/or as moisture curing polymers reactive at room temperature or at elevated temperatures. It is a further object of this invention to provide acrylic polymers which include as at least one of the monomers the reaction product of essentially one mole of a diisocyanate having different rates of reactivity for each of the isocyanate groups, with essentially one mole of an ethylenically unsaturated monomer having active hydrogen functionality. Another object of this invention is to provide improved pigmented coatings or clearcoats which may comprise the isocyanate functional polymer by itself or as a crosslinker in combination with an active hydrogen containing polymer. These and other objects of this invention will be apparent from the following description.

DETAILED DESCRIPTION OF THE INVENTION

The isocyanate functional polymers of this invention comprise the saturated, ungelled addition polymerization reaction product of:

(a) 1 to 100% by weight of at least one isocyanate functional ethylenically unsaturated monomer which comprises the reaction product obtained by the gradual addition of an ethylenically unsaturated monomer having a single active hydrogen to a diisocyanate selected from the group consisting of isophorone diisocyanate and 2,4 toluene diisocyanate wherein the final molar ratio of active hydrogen containing monomer to diisocyanate is essentially 1 to 1; and (b) 0 to 99% by weight of at least one ethylenically unsaturated monomer which is free of active hydrogen functionality and which is copolymerizable with the ethylenically unsaturated isocyanate functional monomer.

By saturated and ungelled is meant that the isocyanate functional polymers are substantially free of unsaturation and yet are still soluble in appropriate solvents.

As mentioned, the isocyanate functional ethylenically unsaturated monomer can be conveniently prepared by the gradual addition of an ethylenically unsaturated monomer having a single active hydrogen into the diisocyanate to provide a final molar ratio of essentially 1 to 1. Gradual addition means that less than all of the active hydrogen containing ethylenically unsaturated monomer required to provide a one to one molar ratio is initially admixed with the diisocyanate, and that the addition will continue over a period of time at a rate designed to allow sufficient mixing of the reactants so that the reaction of the active hydrogen will preferentially take place with the faster reacting isocyanate group of the diisocyanate. The rate of reaction will be dependent upon the reaction temperature, the efficiency of mixing and the quantities of the reactants. However, as a general guideline, no more than about one third of the active hydrogen containing monomer should be added to the diisocyanate in any 20 minute period and it is especially preferred to extend the addition time over about two to about eight hours. Active hydrogen functionality means those reactive groups as determined by the Zerewitinoff Method as described by Kohler in *J. Am. Chem. Soc.*, 49, 3181 (1927). Some such suitable compounds having a single active hydrogen are, for example, ethylenically unsaturated compounds which contain one of the following groups, —OH, —COOH, —SH, or secondary amine —NH.

In order to minimize the manufacture of monomers having two ethylenically unsaturated sites per molecule due to reaction of both isocyanate groups, it is essential in the practice of this invention that the diisocyanate have different rates of reactivity, due to steric and/or electronic effects, for each of its isocyanate groups with respect to the active hydrogen functionality of the unsaturated monomer. Typically this difference in reactivity can be observed in (i) aromatic diisocyanates where one isocyanate group is ortho to an alkyl group while the other is not, or, (ii) aliphatic diisocyanates where one isocyanate group is primary and the other is secondary or tertiary. Especially preferred in the practice of this invention due to their reactivity and commercial availability are isophorone diisocyanate and 2,4-toluene diisocyanate.

In addition to relying on this difference in reactivity, the active hydrogen containing groups should be added gradually over a period of time, e.g. dropwise or in a steady or intermittent stream, to the diisocyanate to provide a final 1:1 molar ratio of active hydrogen monomer to diisocyanate so that there is always at least one equivalent of the faster reacting isocyanate group available for reaction with the active hydrogen group as it is added to the diisocyanate. In fact, although the overall stoichiometry requires essentially one mole of diisocyanate for each mole of the active hydrogen containing monomer, throughout much of the reaction time, due to the gradual addition, there will even be an excess of the equivalents of the faster reacting isocyanate for each equivalent of the active hydrogen group. Additionally, since at least some of the differences in reactivity between the two isocyanate groups may depend upon a difference in activation energy, increases in reaction temperature normally favor the reaction of the slower isocyanate group more than the reaction of the faster isocyanate group, and therefore, the reaction temperature should be minimized. The reaction should be conducted at less than about 250° F. and, preferably, is maintained between about 60° F. and 180° F.

The reaction between the diisocyanate and the active hydrogen containing monomer is typically carried out in the presence of a solvent which does not contain active hydrogen functionality and the reaction can be conveniently monitored by infrared analysis until essentially all of the active hydrogen functionality is reacted. Typical solvents include toluene, xylene, butyl acetate, methyl ethyl ketone etc. If desired, a catalyst for the isocyanate reaction such as metal compounds like dibutyl tin dilaurate, dibutyl tin oxide, zinc napthenate, stannous oxide, or tertiary amines can be added to decrease the processing time. The use of tin catalysts is especially preferred. It is also useful to add a free radical inhibitor, such as butylated hydroxy toluene to the reaction mixture to prevent premature polymerization of the unsaturated monomers.

Preferred ethylenically unsaturated monomers having a single active hydrogen group reactive with the isocyanate representatively have the general formula:

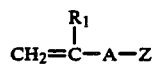

wherein $R_1$ is H or $CH_3$, A can be branched or straight chain and is either a carbonyloxyalkylene radical containing 2 to about 8 carbon atoms or an aralkylene radical containing 7 to about 12 carbon atoms, and Z is OH or $NHR_3$ wherein $R_3$ is a straight chain or branched alkyl radical of 1 to about 6 carbons.

Representative examples of the unsaturated monomer when A is an aralkylene or alkyl substituted aralkylene radical include ortho, meta, and para-vinyl benzyl alcohol, ortho-methyl-paravinyl benzyl alcohol and the like. Representative examples when A is aralkylene or alkyl substituted aralkylene and Z is secondary amine functionality include ortho, meta and para vinyl N-methylaniline, ortho-methyl-para-vinyl N-methyl aniline and the like.

Representative examples where A is a carbonyloxyalkylene radical are monomers having the structure:

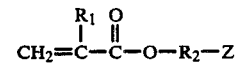

where $R_1$ and Z are defined as above and $R_2$ i a straight chain or branched alkyl radical of 1 to about 8 carbons. Monomers having this structure are especially preferred in the practice of this invention due to their commercial availability and the facility with which they can be subsequently polymerized.

Representative hydroxyl functional monomers include 2-hydroxyethyl acrylate, 2-hydroxyethyl methacrylate, 3-hydroxypropyl acrylate, 4-hydroxybutyl methacrylate, 5-hydroxypentyl acrylate, 5-hydroxy-3-methylpentyl acrylate, 2-hydroxypropyl acrylate, diethylene glycol methacrylate etc. These monomers can be conveniently prepared by the reaction of diols with unsaturated acids such as acrylic or methacrylic acids.

Representative monomers having secondary amine functionality include the esters prepared by the reaction of monofunctional unsaturated acids such as acrylic or methacrylic acid with alcohols having pendant secondary amine groups such as the reaction products of acrylic or methacrylic acid with t-butyl aminoethanol, methylaminoethanol, 2-N-methylamino-1-propanol, etc.

When the isocyanate functional ethylenically unsaturated monomer reaction product of this invention is prepared by the gradual addition of the preferred carbonyloxyalkylene active hydrogen containing ethylenically unsaturated monomers to the diisocyanate either in the presence of no catalyst or in the presence of metal catalyst, experimental evidence indicates that a major portion (at least 50% by weight and typically at least 70% by weight) of the reaction product will be the monoisocyanate functional monomer having the structure:

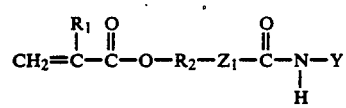

wherein $R_1$ and $R_2$ are defined as above, $Z_1$=—O— or

where $R_3$ is a straight chain or branched alkyl radical of 1 to about 6 carbons, and
Y is

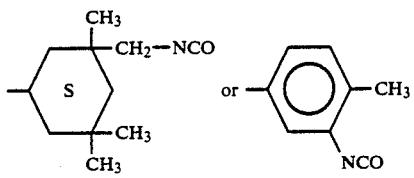

The isocyanate functional ethylenically unsaturated monomer can be homopolymerized or optionally can be copolymerized with at least one other ethylenically unsaturated monomer which is substantially free of active hydrogen functionality to produce isocyanate functional polymers. Representative ethylenically unsaturated monomers which are substantially free of active hydrogen functionality include the unsaturated hydrocarbons such as isoprene, butadiene, ethylene, etc.; vinyl compounds such as styrene, vinyl toluene, vinyl acetate, vinyl chloride, etc.; esters of unsaturated acids such as butylacrylate, butyl methacrylate, methyl methacrylate, isobutyl methacrylate, ethylhexyl acrylate, isobornyl methacrylate, trimethylolpropane triacrylate, etc.; unsaturated tertiary amines such as 2-(N,N-dimethylamino) ethylacrylate, N-vinyl piperidine, etc.

The isocyanate functional polymers can be prepared by conventional free radical addition polymerization techniques. Methods of producing acrylic polymers are well known and are not a part of the present invention. If desired, the free radical polymerization can be catalyzed by conventional catalysts known in the art such as azo, peroxy or redox catalysts. Typically, the initiators must be soluble in an organic solvent and should have a half life of at least about one minute at 250° F. Useful peroxide initiators include di-t-butyl peroxide, t-butyl peracetate, t-butyl perbenzoate, dicumyl peroxide and the like. Useful azo initiators include azobisisobutyronitrile, 2-t-butylazo-2-cyanobutane, 1-t-butylazo-1-cyanocylcohexane, and the like. Typically, the isocyanate functional polymers are produced by heating the unsaturated monomers at temperatures ranging from about 180° F. to about 400° F. and especially 200° F. to about 300° F. to effect the polymerization. It is normally preferred to prepare the polymers by solution polymerization in organic solvents. Typically, a mixture of the monomers will be added gradually to a heated solution of the solvent. The solvents should be free of active hydrogen functionality to avoid any reaction of the remaining free isocyanate groups. Useful solvents include aromatic hydrocarbons such as toluene, xylene, ethylbenzene, aromatic naphtha, etc.; aliphatic hydrocarbons such as mineral spirits, hexane, aliphatic naphtha, etc., esters such as butyl acetate, ethylene glycol monoethyl ether acetate, ethylene glycol monobutyl ether acetate, etc.; and ketones such as ethyl amyl ketone, etc. The aromatic hydrocarbons and ester solvents are especially preferred. Typically the progress of the polymerization can be monitored by measuring the NVM (percent weight solids) of the reaction mixture. The number average molecular weight of the polymers is typically less than 100,000 and preferably less than 50,000.

The isocyanate functional polymers prepared by this addition polymerization reaction can be used as moisture-curing polymers, or as crosslinkers in combination with active-hydrogen containing polymers.

When used as moisture-curing polymers, the isocyanate functional polymers of this invention can contain pigments, catalysts, flexibilizers, flow agents and other additives. It is frequently useful to add a water scavenger, such as phenyl isocyanate, to the moisture curing polymers to scavenge any water to provide improved package stability. The moisture cures can typically be conveniently carried out at temperatures of about 20° C. or greater. Ambient air typically has sufficient moisture to maintain the reaction.

When the isocyanate functional polymers of this invention are used as crosslinkers they can be used in combination with any active hydrogen group-containing polymer such as epoxies, alkyds, acrylics, polyesters, polyurethanes, or the like. Typically the active hydrogen group-containing polymers will have hydroxy or amine functionality as the active hydrogen group. Normally the isocyanate functional polymer and the active hydrogen-containing polymer are maintained as two separate components and then blended shortly before application. The coating is then applied to a substrate, such as metal, plastic, wood, glass, paper, synthetic fibers, etc.; by brushing, dipping, roll coating, flow coating, spraying or other method conventionally employed in the coating industry. The isocyanate functional polymer and the active hydrogen containing polymer normally will be blended in a ratio to provide at least about 0.5 equivalents of isocyanate for each equivalent of active hydrogen, and typically the ratio will be between about 0.5 to 3.0 equivalents of isocyanate for each equivalent of active hydrogen. Preferably, about 0.8 to about 1.2 equivalents of isocyanate will be present for each equivalent of active hydrogen. When used as a two component system, typically one component will comprise the isocyanate functional polymer as a solvent solution and the other component will comprise the active hydrogen containing polymer which optionally may include pigments, flexibilizers, solvents, ultraviolet light stabilizers, or other additives. The two components are usually mixed together immediately prior to use to prevent premature crosslinking. The two component coatings can conveniently be cured at temperatures of about 20° to 150° C.

The isocyanate functional polymers of this invention, either as moisture curing polymers or as crosslinkers in a two component system have shown special utility when utilized in clearcoat/basecoat compositions.

Clearcoat/basecoat systems are well known, especially in the automobile industry where it is especially useful to apply a pigmented basecoat, which may contain metalic pigments, to a substrate and allow it to form a polymer film followed by the application of a clearcoat which will not mix with or have any appreciable solvent attack upon the previously applied basecoat. The basecoat composition may be any of the polymers known to be useful in coating compositions.

One useful polymer basecoat includes the acrylic addition polymers, particularly polymers or copolymers of one or more alkyl esters of acrylic acid or methacrylic acid, optionally together with one or more other ethylenically unsaturated monomers. These polymers may be of either the thermoplastic type or the thermosetting, crosslinking type which contain hydroxyl or amine or other reactive functionality which can be crosslinked. Suitable acrylic esters for either type of polymer include methyl methacrylate, ethyl methacrylate, propyl methacrylate, butyl methacrylate, ethyl acrylate, butyl acrylate, vinyl acetate, acrylonitrile, acrylamide, etc. Where the polymers are required to be of the crosslinking type, suitable functional monomers which can be used in addition to those already mentioned include acrylic or methacrylic acid, hydroxy ethyl acrylate, 2-hydroxy propyl methacrylate, glycidyl acrylate, tertiary-butyl amino ethyl methacrylate, etc. The basecoat composition may, in such a case, also contain a crosslinking agent such as a polyisocyanate (including the novel polyisocyanate polymers of this invention), a polyepoxide, or a nitrogen resin such as a condensate of formaldehyde with a nitrogeneous compound such as urea, melamine or benzoguanamine or a lower alkyl ether of such a condensate. Other polymers useful in the basecoat composition include vinyl copolymers such as copolymers of vinyl esters of inorganic or organic acids, such as vinyl chloride, vinyl acetate, vinyl propionate, etc., which copolymers may be optionally be partially hydrolyzed so as to introduce vinyl alcohol units.

Other polymers useful in the manufacture of the basecoat include alkyd resins or polyesters which can be prepared in a known manner by the condensation of polyhydric alcohols and polycarboxylic acids with or without the inclusion of natural drying oil fatty acids. The polyesters or alkyds may contain a proportion of free hydroxyl an/or carboxyl groups which are available for reaction, if desired with suitable crosslinking agents as discussed above.

If desired, the basecoat composition may also contain minor amounts of a cellulose ester, to alter the drying or viscosity characteristics of the basecoat.

Typically, the basecoat will include pigments conventionally used for coating compositions, such as titanium dioxide, iron oxide, carbon black, metallic flake pigments such as aluminum flake, copper flake, metalized plastic flake such as metalized Mylar ® flake, inorganic flake pigments such as mica flake, organic pigments such as phthalocyanine blue, etc.

Typically, the basecoat is applied to the substrate, which may or may not previously have been primed, and the basecoat is allowed sufficient time to form a polymer film which will not be lifted during the application of the clearcoat. The clearcoat is then applied to the surface of the basecoat, and the system can be allowed to dry or, if desired, can be force dried by baking the coated substrate at temperatures typically ranging up to about 250° F.

Within the teaching of this invention, the clearcoat may comprise either the isocyanate functional polymer alone, or in combination with an active hydrogen functional polymer in a two-component system which is mixed together prior to application. Typically, the clearcoat may contain ultraviolet light absorbers such as hindered phenols or hindered amines at a level ranging up to about 6% by weight of the vehicle solids as is well known in the art. When the isocyanate functional polymer is used in a clearcoat composition, or in any composition requiring resistance to ultraviolet light, it is preferred to use the aliphatic diisocyanate based polymers rather than the aromatic diisocyanate versions since the polymers based upon the aliphatic diisocyanates have better resistance to ultraviolet light.

The following examples have been selected to illustrate specific embodiments and practices of advantage to a more complete understanding of the invention. Unless otherwise stated the term "parts" means parts by weight.

EXAMPLE I

An isocyanate functional unsaturated monomer is prepared by charging a reaction vessel equipped with stirrer, nitrogen sparge, and dropping funnel with 2,670 parts of a 50% solution of isophorone diisocyanate (IPDI) in 2-methoxypropyl acetate, 10.56 parts butylated hydroxy toluene, 10.56 parts dibutyltin dilaurate. The mixture was heated to 145° F. and continuously purged with nitrogen. 1,564 parts of a 50% solution of hydroxyethyl methacrylate (HEMA) in 2-methoxypropyl acetate was added dropwise to the reaction mixture over a four and one-half hour period. The reaction was monitored by IR until essentially all of the hydroxyl absorption had disappeared and there was no further change in the urethane absorption. NMR analysis indicated that a major portion (approximately 70% by weight) of the reaction product was an isocyanate functional unsaturated monomer having a free primary isocyanate group. The remaining 30% of the reaction product was primarily the diadduct containing no free isocyanate and two unsaturated functional groups. This is especially surprising in light of prior art teaching which implied that primary aliphatic isocyanate groups would react faster than secondary aliphatic isocyanate groups.

EXAMPLE II

An isocyanate functional unsaturated monomer was prepared by charging a reaction vessel equipped as in Example I with 444 parts of a 50% by weight solution of isophorone diisocyanate in 2-ethoxyethyl acetate. 232 parts of a 50% solution of 1-hydroxy ethyl acrylate (HEA) in 2-ethoxyethyl acetate was added dropwise to the isophorone diisocyanate solution over about a three our period. The reaction mixture was allowed to stand at room temperature for about 20 hours and then heated to about 220° F. and maintained at that temperature for approximately 10 hours. Infrared analysis indicated essentially all of the hydroxyl functionality had been reacted.

EXAMPLE III

An isocyanate functional unsaturated monomer was prepared by charging a reaction vessel equipped as in Example I with 999 parts isophorone diisocyanate, 999 parts xylene, 8 parts dibutyl tin dilaurate, and 8 parts butylated hydroxy toluene. The solvent solution was heated to about 140° F. and a solution of 585 parts hydroxy propyl acrylate (HPA) in 585 parts xylene was added dropwise to the isophorone diisocyanate solution over about 3½ hour period. The reaction mixture was held at about 140° F. for an additional 90 minutes and the reaction mixture was allowed to cool. Infrared analysis indicated that essentially all of the hydroxyl functionality had been reacted.

EXAMPLE IV

An isocyanate functional unsaturated monomer was prepared by charging a reaction vessel with 200 parts 2,4-toluene diisocyanate (TDI), 200 parts toluene, and 1.75 parts butylated hydroxy toluene. A solution of 150 parts hydroxy ethyl methacrylate in 150 parts toluene was added dropwise to the 2,4-toluene diisocyanate/toluene solution over a period of about 4½ hours. During this addition time the reaction temperature exothermed from about 76° F. to about 90° F. The reaction mixture was allowed to cool and infrared analysis indicated that essentially all of the hydroxyl functionality had been reacted.

EXAMPLE V

An isocyanate functional unsaturated monomer was prepared by charging a reaction vessel with 425 parts isophorone diisocyanate, 3.9 parts butylated hydroxy toluene, 779 parts xylene and 3.9 parts dibutyl tin dilaurate. The reaction mixture was heated to about 140° F. and 354 parts tertiary butyl amino ethyl methacrylate (TBAEMA) was added dropwise to the isocyanate solution over a period of about 3 hours. The reaction temperature was maintained at about 140° F. for an additional two hours after which the reaction mixture was allowed to cool. Infrared analysis indicated that essentially all of the secondary amine functionality had been reacted.

EXAMPLE VI

An acrylic resin having free isocyanate functionality was prepared by adding 426 parts xylene into a reaction vessel containing a thermometer, nitrogen inlet, and stirring shaft. The mixture was heated to 210° F. and maintained at that temperature under nitrogen purge for five hours while a mixture of:

| Raw Materials | Parts By Weight |
|---|---|
| HEMA/IPDI Adduct of Example I | 1620 |
| Isobornyl methacrylate | 102 |
| Isobutyl methacrylate | 102 |
| Vazo 64[1] | 41 |

[1] 1,1'-azobis-(isobutyronitrile)

was added dropwise to the heated solvent solution.

The reaction was maintained at 210° F. for approximately one hour and 45 minutes after the addition was completed to produce an acrylic polymer having an NVM of 45.2% and a percent NCO on solution of 4.30.

EXAMPLE VII

In a manner similar to that of Example VI, an acrylic vehicle was prepared by adding 337 parts butyl acetate solvent to a reaction vessel and maintaining the temperature at approximately 210° F. for about five hours while a mixture of:

| Raw Materials | Parts by Weight |
|---|---|
| HEMA/IPDI adduct of Example I | 1575 |
| Styrene | 169 |
| Butyl Methacrylate | 169 |
| Vazo 67[1] | 45 |

[1] 2,2'-azobis-(2-methylbutyronitrile)

was added to the heated solvent mixture.

The reaction was maintained at 210° F. for one hour after the addition was completed yielding an isocyanate functional acrylic resin with an NVM of about 51%.

EXAMPLE VIII

In a manner similar to that of Example VI, an acrylic homopolymer was manufactured by heating 300 parts butyl acetate solvent to about 210° F. followed by the addition of the following mixture of raw materials over about a five hour period:

| Raw Materials | Parts by Weight |
|---|---|
| HEMA/IPDI adduct of Example I | 2250 |
| Vazo 64 | 45 |

The reaction mixture was maintained at about 210° F. for an additional hour after all of the monomer was added. The isocyanate functional homopolymer prepared in this manner had excellent clarity and an NVM of about 46%.

EXAMPLE IX

In a manner similar to that of Example VI an acrylic vehicle was manufactured by adding to a heated solution of 683 parts butyl acetate, the following materials:

| Raw Materials | Parts by Weight |
|---|---|
| HEMA/IPDI adduct of Example I | 735 |
| Methyl methacrylate | 262 |
| Styrene | 158 |
| Butyl Methacrylate | 263 |
| Vazo 64 | 37 |

The mixture was added dropwise over a period of about six hours and the reaction mixture was maintained at about 215°-220° F. for an additional hour to yield an isocyanate functional acrylic polymer having an NVM of about 55%.

EXAMPLE X

An acrylic resin having free isocyanate functionality was prepared by adding 109.8 parts 2-ethoxyethyl acetate into a reaction vessel containing a thermometer, nitrogen inlet, and stirring shaft and heated to 240° F. under a nitrogen purge. Over a three hour period a mixture of:

| Raw Materials | Parts by Weight |
|---|---|
| HEA/IPDI adduct of Example II | 94.5 |
| Butyl acrylate | 18.8 |
| Styrene | 18.8 |
| Methyl methacrylate | 25.0 |
| Vazo 64 | 6.3 | was added to the heated solvent solution.

After the addition was completed, the reaction mixture was held at approximately 240° F. for approximately two hours and then an additional 2.0 parts of Vazo 64 in 10 parts 2-ethoxyethyl acetate, was added to the mixture. The reaction mixture was maintained at approximately 240° F. for an additional six hours to yield a clear, low viscosity isocyanate functional resin having an NVM of about 37%.

EXAMPLES XI

A polymer having free isocyanate functionality was prepared by adding 563 parts xylene to a reaction vessel equipped as described in Example X. The solvent was heated to 225° F., maintained under a nitrogen purge, and over a period of about 4 hours a mixture of:

| Raw Materials | Parts by Weight |
|---|---|
| HPA/IPDI Adduct of Example III | 1125 |
| Butyl methacrylate | 281 |

-continued

| Raw Materials | Parts by Weight |
| --- | --- |
| Methyl methacrylate | 281 |
| Vazo 67 | 51 | was added to the heated solvent solution.

After the addition was complete the reaction mixture was maintained at about 225° F. for about two hours to yield a clear, low viscosity isocyanate functional resin having an NVM of about 49.3%.

EXAMPLE XII

An isocyanate functional polymer was prepared by adding 300 parts butyl acetate to a reaction vessel equipped as described in Example X. The solvent was heated to approximately 210° F. and maintained at that temperature under a nitrogen purge for approximately five hours while a mixture of:

| Raw Materials | Parts by Weight |
| --- | --- |
| HEMA/TDI adduct of Example IV | 600 |
| Styrene | 150 |
| Butyl acrylate | 60 |
| Methyl Methacrylate | 90 |
| Vazo 64 | 10 | was added dropwise to the heated solvent solution.

The reaction was maintained at about 210° F. for an additional hour after the addition was completed to produce an acrylic polymer having an NVM of about 42%.

EXAMPLE XIII

An isocyanate functional polymer was prepared by adding 813 parts xylene to a reaction vessel equipped as described in Example X. The xylene was heated to about 215° F. and maintained at that temperature under a nitrogen purge for approximately four hours while a mixture of:

| Raw Materials | Parts by Weight |
| --- | --- |
| TBAEMA/IPDI adduct of Example V | 875 |
| Methyl methacrylate | 313 |
| Butyl methacrylate | 313 |
| Styrene | 188 |
| Vazo 67 | 56 | was added dropwise to the heated solvent solution. An additional 11 parts Vazo 67 in 100 parts xylene was added to the reaction mixture and the mixture was maintained at about 215° F. for about three hours to yield a low viscosity resin solution having an NVM of about 48.1%.

EXAMPLE XIV

A moisture curing primer was prepared according to the following recipe:

| Raw Materials | Parts by Weight |
| --- | --- |
| Soya lecithin | 3 |
| Xylene | 81 |
| Magnesium silicate | 129 |
| Barytes | 28 |
| Titanium dioxide | 46 |
| Phenyl isocyanate | 8 |

This mixture was ground to about 5H hegman by shaking the mixture with glass beads for about one hour. Then the following materials were added.

| Raw Materials | Parts by Weight |
| --- | --- |
| Toluene | 50 |
| HEMA/IPDI homopolymer of Example VIII | 210 |

The beads were filtered from the mixture and the coating was spray applied to a metal panel and allowed to air dry at room temperature producing a hard cured primer finish.

EXAMPLE XV

A clearcoat was prepared by mixing:

| Raw Materials | Parts by Weight |
| --- | --- |
| Isocyanate functional polymer of Example XIII | 75 |
| Toluene | 66 |
| Xylene | 14 |
| Zinc Napthanate (8%) | 1.5 |
| Tinuvin[1] 292 | 0.8 |

[1]trademark of Ciba-Geigy for bis(1,2,2,6,6-pentamethyl-4-piperdinyl)sebacate light stabilizer A clearcoat/basecoat system was prepared by priming a steel panel with a dry film thickness of about 1.7 mils of a commercially available automotive primer. A commercially available white automotive acrylic lacquer basecoat was applied to the primer to provide a dry film thickness of about 3.0. The basecoat was then topcoated with the clear formulation of this example to provide a dry film thickness of the clear of about 1.4 mils. The basecoat/clearcoat system provided excellent 60 and 20° gloss, a tack free time of about 3 hours, and excellent hardness after air drying at room temperature for one day.

EXAMPLE XVI

A clearcoat formulation was prepared by mixing:

| Raw Materials | Parts by Weight |
| --- | --- |
| Isocyanate functional polymer of Example XI | 75 |
| Toluene | 66 |
| Aromatic Naptha | 9 |
| Methyl n-amyl ketone | 4.5 |
| Zinc Napthanate (8%) | 1.5 |
| Tinuvin ® 292 | 0.4 |
| Tinuvin ® 328 | 0.4 |

A clearcoat/basecoat system was prepared by applying a 2.0 mil dry film thickness of commercially available automotive primer, followed by 2.8 mil dry film thickness of commercially available acrylic lacquer basecoat, followed by 1.5 mils dry film thickness of the clear coating of this example. Each of the coats were spray applied. The clearcoat was tack free in approximately 3½ hours and the clearcoat/basecoat system showed excellent 60° and 20° gloss, excellent hardness and, after one week air dry showed excellent resistance to solvents such as xylene and methyl ethyl ketone.

EXAMPLE XVII

A clear coating comprising a mixture of:

| Raw Materials | Parts by Weight |
|---|---|
| Acryloid AU-608[1] | 500.0 |
| Toluene | 1000.0 |
| Xylene | 1000.0 |
| Tinuvin[2] 770 | 3.0 |
| Tinuvin[3] 328 | 3.0 |

[1] Hydroxyl-functional acrylic resin sold by Rohm & Haas Company having an NVM of approximately 60% and a hydroxyl equivalent weight (solids basis) of 600.
[2] Trademark of Ciba-Geigy for di[4(2,2,6,6 tetramethyl piperdinyl)]sebacate light stabilizer.
[3] Trademark of Ciba-Geigy for 2-(2 hydroxy-3,5-ditertiary amyl-phenol)-2H-benzotriazole.

was prepared as one component and then mixed with 386 parts of the isocyanate functional polymer of Example VIII as the second component to give an NCO/OH ratio of about 1.2:1. This coating was spray applied and air dried to produce a hard, glossy cured film having excellent durability.

EXAMPLE XVIII

A clear solution was prepared by mixing:

| Raw Materials | Parts by Weight |
|---|---|
| Isocyanate functional polymer of Example IV | 63.0 |
| Toluene | 22.0 |
| Aromatic naptha | 3.0 |
| Xylene | 6.0 |
| Flexol 4G0[1] | 2.0 |
| Zinc octoate | 1.0 |
| Tinuvin 292 | 0.7 |

[1] Flexibilizer manufactured by Union Carbide.

A crosslinked basecoat was prepared by mixing one quart of the above-described clear solution into one gallon of a commercially available acrylic modified alkyd (Acrylyd ® acrylic manufactured by The Sherwin-Williams Company). This basecoat was spray applied to a metal substrate and allowed to air dry. The basecoat was then topcoated by spray application of the clear solution described above. The clearcoat was then allowed to air dry yielding a cured, solvent resistant clearcoat/basecoat finish having excellent gloss.

EXAMPLE XIX

A clear coating was prepared by mixing:

| Raw Materials | Parts by Weight |
|---|---|
| QR-765M[1] | 300 |
| Ethyl ortho formate | 10 |
| Xylene | 300 |
| Dibutyl tin dilaurate | 2 |
| HEMA/IPDI homopolymer of Example VIII | 950 |

[1] Amine functional acrylic resin manufactured by The Rohm & Haas Company having an NVM of 50.5%, pH (as supplied) of 10.0, an amine equivalent weight (solid basis) of 165 and a density of 8.6 pounds per gallon.

to give an NCO/amine equivalent ratio of approximately 1.5:1.0. The ethyl ortho formate is used to scavenge any water remaining in the QR-765M. This clear can be spray applied and allowed to air dry to produce a hard, solvent resistant film.

While this invention has been described by a specific number of embodiments, it is obvious that other variations and modifications may be made without departing from the spirit and scope of the invention as set forth in the appended claims.

The invention claimed is:

1. In a substrate coated with a multi-layer decorative and/or protective coating which comprises:
   (a) a base coat comprising a pigmented film-forming polymer; and
   (b) a transparent clear coat comprising a film-forming polymer applied to the surface of the base coat composition;
   the improvement which comprises utilizing as the clear coat a moisture curable isocyanate functional polymer which comprises the saturated, ungelled addition polymerization reaction product of:
   (i) 1 to 100% by weight of at least one isocyanate functional ethylenically unsaturated monomer which comprises the reaction product obtained by the gradual addition of an ethylenically unsaturated monomer having a single active hydrogen to a diisocyanate selected from the group consisting of isophorone diisocyanate and 2,4 toluene diisocyanate wherein the final molar ratio of active hydrogen containing monomer to diisocyanate is essentially 1 to 1; and
   (ii) 0 to 99% by weight of at least one ethylenically unsaturated monomer which is free of active hydrogen functionality and which is copolymerizable with the ethylenically unsaturated isocyanate functional monomer.

2. The coated substrate of claim 1 wherein the isocyanate functional polymer is further characterized in that the ethylenically unsaturated monomer having a single active hydrogen has the structure:

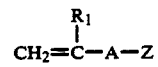

wherein $R_1$ is H or $CH_3$; A is straight chain or branched and is either a carbonyloxyalkylene radical containing 2 to about 8 carbon atoms or an aralkylene radical containing 7 to about 12 carbon atoms, and Z is OH or $NHR_3$ wherein $R_3$ is a straight chain or branched alkyl radical of 1 to about 6 carbons.

3. The coated substrate of claim 1 wherein the isocyanate functional polymer is further characterized in that the ethylenically unsaturated monomer having a single active hydrogen has the structure:

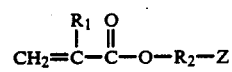

wherein $R_1$ is H or $CH_3$;
$R_2$ is a straight chain or branched alkyl radical of 1 to about 8 carbons; and
Z is OH or $NHR_3$ where $R_3$ is a straight chain or branched alkyl radical of 1 to about 6 carbons.

4. The coated substrate of claim 1 wherein the isocyanate functional polymer is further characterized in that a major portion of the reaction product obtained by the reaction of the diisocyanate and the active hydrogen functional unsaturated monomer is an isocyanate functional ethylenically unsaturated monomer having the structure:

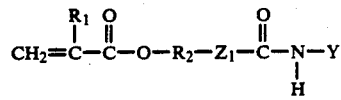

wherein $R_1$=H or $CH_3$;
$R_2$=a straight chain or branched alkyl radical of 1 to about 6 carbons;
$Z_1$=—O— or

where $R_3$ is a straight chain or branched alkyl radical of 1 to about 6 carbons; and
Y is

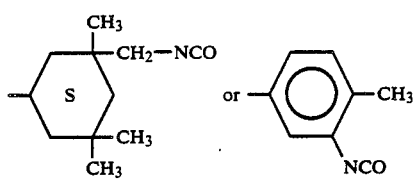

5. In a substrate coated with a multi-layer decorative and/or protective coating which comprises:
   (a) a base coat comprising a pigmented film-forming polymer; and
   (b) a transparent clear coat comprising a film-forming polymer applied to the surface of the base coat composition;
the improvement which comprises utilizing as the clear coat a two component coating which is mixed prior to application, the coating comprising an active hydrogen functional polymer and an isocyanate functional polymer, wherein the isocyanate functional polymer comprises the saturated, ungelled addition polymerization reaction product of:
   (i) 1 to 100% by weight of at least one isocyanate functional ethylenically unsaturated monomer which comprises the reaction product obtained by the gradual addition of an ethylenically unsaturated monomer having a single active hydrogen to a diisocyanate selected from the group consisting of isophorone diisocyanate and 2,4 toluene diisocyanate wherein the final molar ratio of active hydrogen containing monomer to diisocyanate is essentially 1 to 1; and
   (ii) 0 to 99% by weight of at least one ethylenically unsaturated monomer which is free of active hydrogen functionality and which is copolymerizable with the ethylenically unsaturated isocyanate functional monomer.

6. The coated substrate of claim 5 wherein the isocyanate functional polymer is further characterized in that the ethylenically unsaturated monomer having a single active hydrogen has the structure:

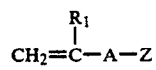

wherein $R_1$ is H or $CH_3$; $A_2$ is straight chain or branched and is either a carbonyloxyalkylene radical containing 2 to about 8 carbon atoms or an aralkylene radical containing 7 to about 12 carbon atoms, and Z is Oh or $NHR_3$ wherein $R_3$ is a straight chain or branched alkyl radical of 1 to about 6 carbons.

7. The coated substrate of claim 5 wherein the isocyanate functional polymer is further characterized in that the ethylenically unsaturated monomer having a single active hydrogen has the structure:

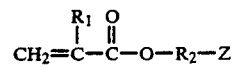

wherein $R_1$ is H or $CH_3$;
$R_2$ is a straight chain or branched alkyl radical of 1 to about 8 carbons; and
Z is OH or $NHR_3$ where $R_3$ is a straight chain or branched alkyl radical of 1 to about 6 carbons.

8. The coated substrate of claim 5 further characterized in that a major portion of the reaction product obtained by the reaction of the diisocyanate and the active hydrogen functional unsaturated monomer is an isocyanate functional ethylenically unsaturated monomer having the structure:

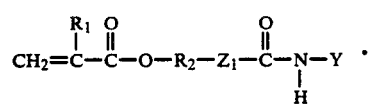

wherein $R_1$=H or $CH_3$;
$R_2$=a straight chain or branched alkyl radical of 1 to about 6 carbons;
$Z_1$=—O— or

where $R_3$ is a straight chain or branched alkyl radical of 1 to about 6 carbons; and
Y is

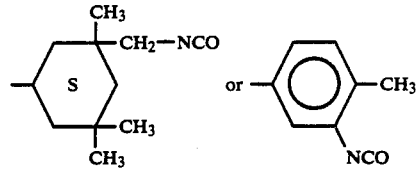

* * * * *